No. 758,956.

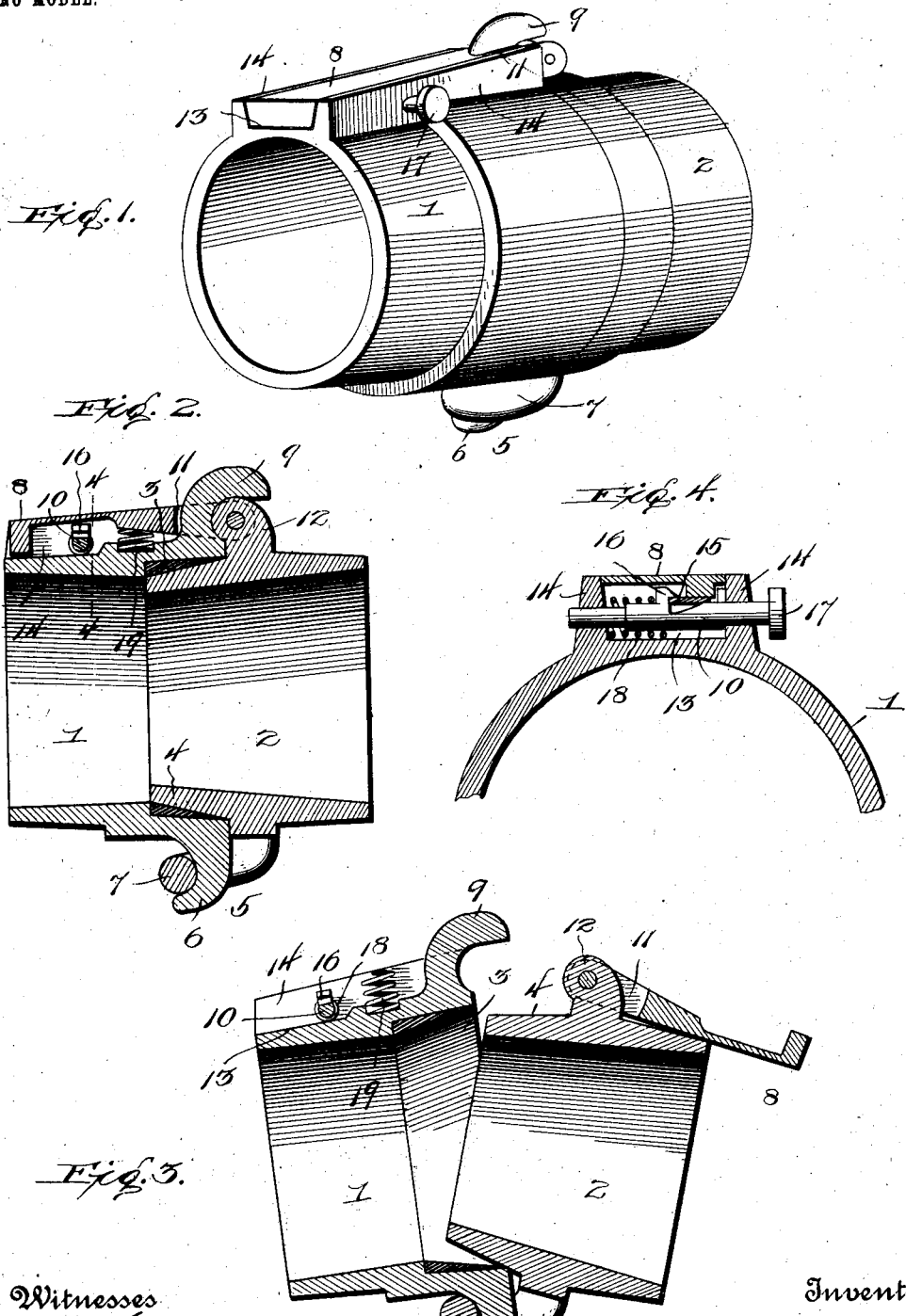

Patented May 3, 1904.

UNITED STATES PATENT OFFICE.

GEORGE B. McLELLAN BUZZELL, OF BOSTON, MASSACHUSETTS.

HOSE-COUPLING.

SPECIFICATION forming part of Letters Patent No. 758,956, dated May 3, 1904.

Application filed May 8, 1903. Serial No. 156,271. (No model.)

*To all whom it may concern:*

Be it known that I, GEORGE B. MCLELLAN BUZZELL, a citizen of the United States, residing at Boston, in the county of Suffolk and State of Massachusetts, have invented certain new and useful Improvements in Hose-Couplings, of which the following is a specification.

This invention relates to couplings of the detachable type wherein the separate pipe members may be readily connected and disconnected with great facility, and thereby obviating the objections to the common type of screw-joint for hose-couplings.

To this end the invention contemplates an improved construction of hose-coupling embodying simple and positive means for securely locking the separate members of the coupling together, while at the same time permitting of the quick uncoupling thereof by the simple pressure of the finger upon the locking device constituting one of the parts of the complete coupling.

With these and many other objects in view, which will more readily appear as the nature of the invention is better understood, the same consists in the novel construction, combination, and arrangement of parts, as will be hereinafter more fully described, illustrated, and claimed.

The essential feature of the invention involved in the novel manner of connecting and locking the separate members of the coupling is susceptible to modification without departing from the spirit or scope of the invention; but a preferred embodiment of the latter is shown in the accompanying drawings, in which—

Figure 1 is a perspective view of a hose-coupling embodying the present invention and shown with the parts in coupled position. Fig. 2 is a longitudinal sectional view of the coupling with the parts coupled. Fig. 3 is a similar view showing the parts uncoupled. Fig. 4 is a detail sectional view on the line 4 4 of Fig. 2.

Like numerals of reference designate corresponding parts throughout the several figures of the drawings.

In carrying out the invention the coupling proper, as usual, essentially consists of the separate pipe members 1 and 2, which are connected to the separate sections of the hose in any approved manner and are designed to be coupled and uncoupled in the use of the hose.

To insure a perfectly water-tight joint between the separate members of the coupling when coupled, it is preferable to provide the pipe member 1 at one end thereof with a flared packed mouth 3, adapted to receive the tapered joint-nose 4 at one end of the pipe member 2, said tapering elements 3 and 4 having a tight registering fit when the pipe members 1 and 2 are alined, and thereby providing a well-packed taper joint between the separate members of the coupling to obviate leaking when the same are fitted together.

To facilitate the coupling and uncoupling of the members 1 and 2, a separable hinge connection is provided between the adjacent ends of the two members at one side thereof. This separable hinge connection is designated in its entirety by the numeral 5 and essentially consists of an open bearing-hook 6, projected integrally from one side of the pipe member 1 contiguous to one end thereof, and the open hinge-loop 7, laterally offset from the pipe member 2 and projected at an angle therefrom, so as to loosely and detachably interlock with the hook 6. This connection permits the two pipe members to be swung toward and from each other in the coupling and uncoupling operation, while at the same time admitting of the ready separation of these two members when the coupling is opened up.

To provide for fastening or locking the pipe members when coupled, there is employed a manually-controlled fastening device, including in its general organization a swinging latch-bar 8, carried by the pipe member 2 and coöperating with the coupling-hook 9 and also with the locking device 10, carried by the pipe member 1. The swinging latch or latch-bar 8 is provided with a bifurcated end 11, pivotally mounted on the rounded holding-lug 12, projected from the side of the pipe member 2, diametrically opposite the hinge-loop 7, and said bifurcated end 11 constitutes a catch-opening adapted to take over and receive the coupling-hook 9, which is integrally projected from the side of the pipe member 1 opposite the bearing-hook 6 and projects in a direction away from the adjacent end of the pipe member 1, so as to be properly engaged by the opening 11 of the latch and to register over and coöperate with the holding-lug 12, which passes into the hook 9 when the two members are united.

The swinging latch 8 when thrown over the hook 9 is designed to be carried into the keeper-seat 13, provided upon one side of the pipe member 1 between the offstanding seat-flanges 14, and adjacent to the free swinging edge thereof the latch-bar has offset from the under side thereof a catch-plate 15, whose edge is adapted to be engaged by the shouldered fastening-hook 16 of the transversely-arranged locking device 10.

The locking device 10 is in the form of a sliding bolt, mounted in suitable guides or openings provided in the flanges 14 and arranged transversely of the seat 13. The said bolt 10 is provided at one end with a finger-button 17 and has coiled thereon an adjusting-spring 18, which normally holds the bolt in position for the beveled and shouldered fastening-hook 16 to be engaged by the latch-plate 15 when the latch-bar is pressed down within its seat 13.

Between the locking device and the coupling-hook 9 there is arranged in the seat 13 an opening-spring 19, which normally exerts its tension in a direction for throwing the latch-bar upwardly to an uncoupling position when disengaged from the locking device or bolt 10 by an inward pressure upon the locking device or bolt.

From the foregoing it is thought that the construction, operation, and many advantages of the herein-described hose-coupling will be readily apparent without further description, and it will also be understood that changes in the form, proportion, and minor details of construction may be resorted to without departing from the spirit of the invention or sacrificing any of the advantages thereof.

Having thus described the invention, what is claimed, and desired to be secured by Letters Patent, is—

1. A hose-coupling comprising separate pipe members having a separable hinge connection at one side, one of said pipe members being provided with a coupling-hook and a locking device, and a latch pivotally carried by the other pipe member and engaged by the locking device, the pivotal support of the latch being shaped and arranged for engagement within the bight of said hook, substantially as set forth.

2. A hose-coupling comprising separate members having a separable hinge connection at one side, one of said pipe members being provided with an open coupling-hook, and a spring-actuated finger-controlled locking device, and a latch-bar pivotally carried by the other pipe member and engaged by the locking device, said bar having an opening receiving the open coupling-hook whereby the pivotal support of the bar becomes engaged within the bight of the hook.

3. A hose-coupling comprising separate pipe members, one of which is provided at one side with an open bearing-hook and at its opposite side with an offstanding coupling-hook and a keeper-seat, and the other of said pipe members being provided at one side with an open hinge-loop for engagement with said bearing-hook and at the opposite side with a holding-lug adapted to register in the bight of the coupling-hook of the other pipe member, a spring-actuated finger-controlled locking-bolt arranged transversely of the keeper-seat of one pipe member and provided with a beveled-shouldered fastening-hook, a swinging latch-bar pivotally mounted upon the holding-lug of one of the pipe members and provided with a catch-opening for engagement with the coupling-hook and also with a catch-plate for engagement with the fastening-hook of the locking-bolt, and an opening-spring arranged in said keeper-seat beneath the latch-bar.

In testimony whereof I affix my signature in presence of two witnesses.

GEORGE B. Mc. BUZZELL.

Witnesses:
JOHN P. OHLSON,
W. A. M. BERGQUIST.